United States Patent Office 2,869,894
Patented Jan. 20, 1959

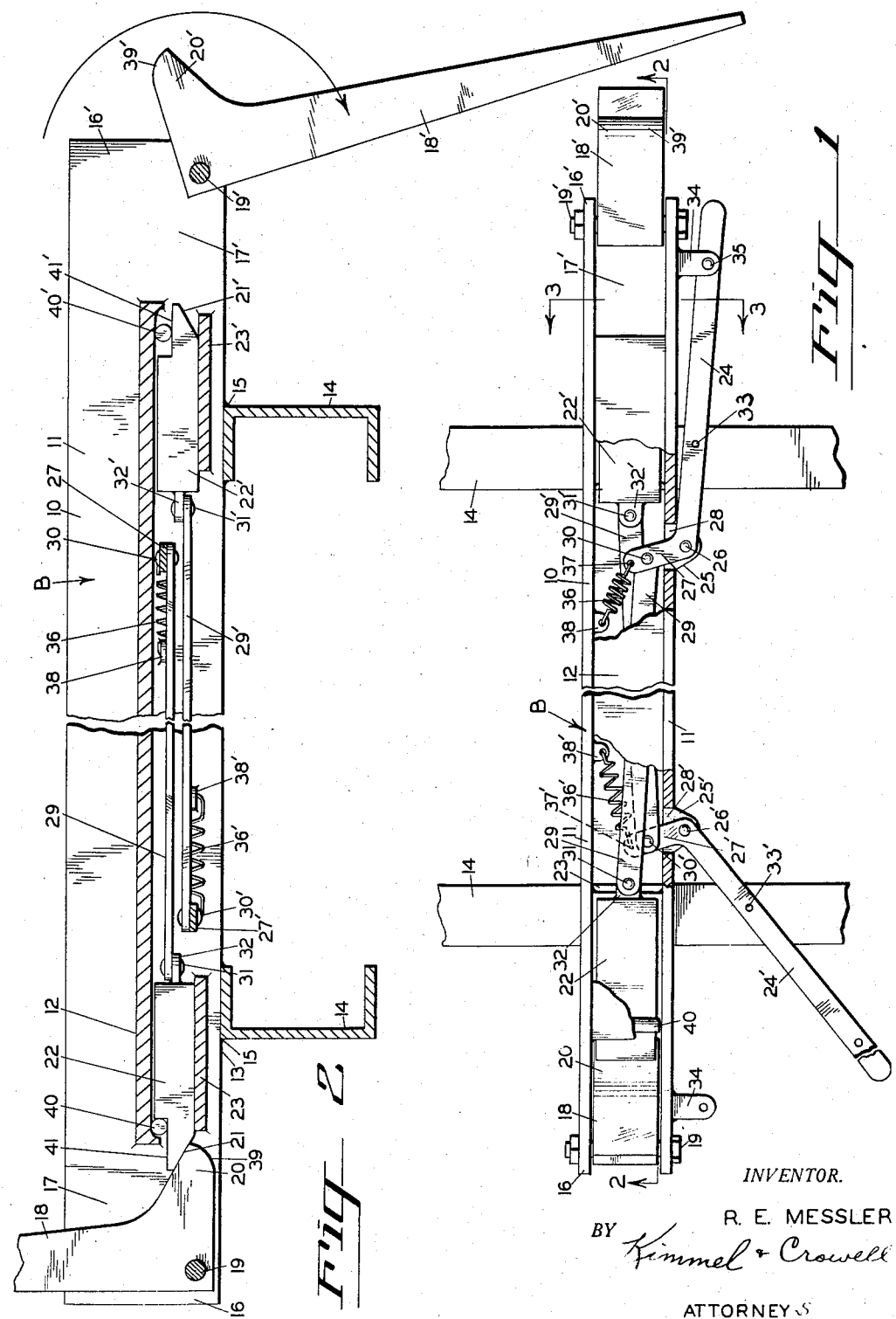

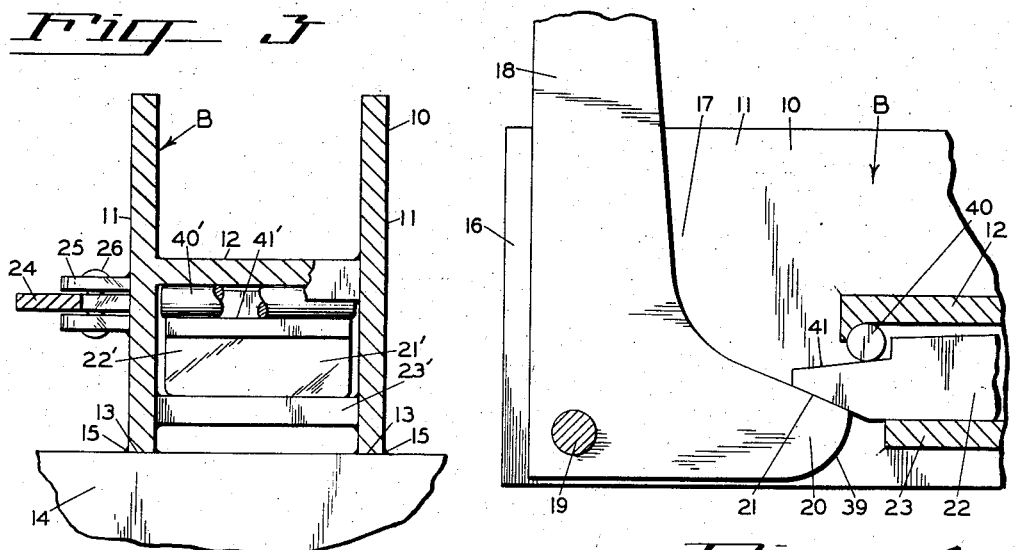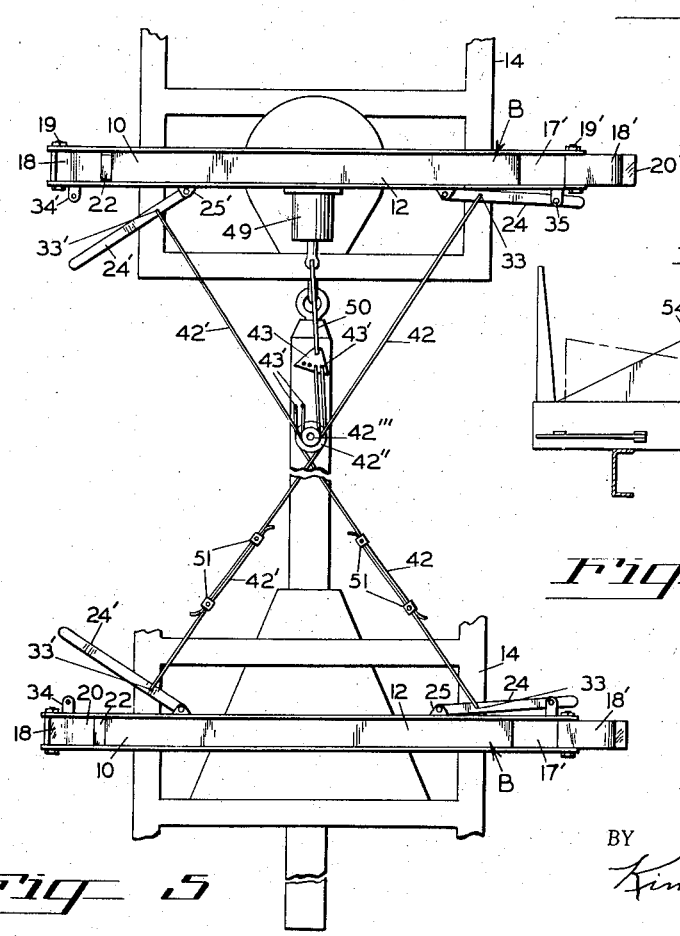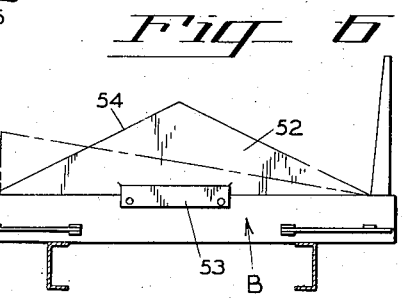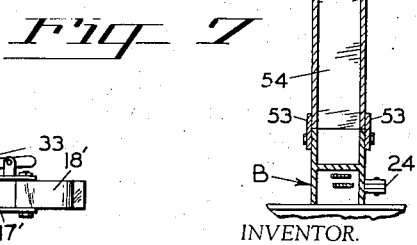
Jan. 20, 1959 — R. E. MESSLER — 2,869,894
DROP STAKES WITH VEE TYPE BUNKS, LOG BUNKS AND OTHER VEHICLES USING STAKES
Filed March 4, 1957 — 2 Sheets-Sheet 2
INVENTOR.
R. E. MESSLER
BY Kimmel & Crowell
ATTORNEYS

2,869,894

DROP STAKES WITH VEE TYPE BUNKS, LOG BUNKS AND OTHER VEHICLES USING STAKES

Raymond E. Messier, Boise, Idaho

Application March 4, 1957, Serial No. 643,789

3 Claims. (Cl. 280—145)

The present invention relates to drop stakes for load carrying bunks, such as logging trucks and trailers, railroad log carrying cars and any other type of load carrier for carrying loads.

The pimary object of the invention is to provide a simple locking device for holding drop stakes in upright position for holding loads on any vehicle on which it is used.

A further object of the invention is to provide a locking device which will automatically lock the stake in a vertical position when the stake is raised to this vertical position by the operator.

Another object of the invention is to provide a locking mechanism that can be released from the opposite side of the truck body.

Another object of this invention is to provide an inverted V-shaped or side sloping base associated with the bunk that will discharge the load from the bunk by gravity when the drop stakes are released. This V-shaped base can form part of the bunk or it may be an attachment to be placed on a standard elongated bunk. An inverted V-shaped or side sloping base associated with the bunk and supporting the load will, the instant the stakes are dropped, cause the load to roll by gravity off the ends of the bunk.

Another object of the invention is to provide a means that will trip one, several, or all of the stakes, at a time, controlled by the operator at a safe distance from the load being dumped.

A further object of the invention is to provide a safe locking mechanism for bunk stakes, approved by state safety regulations, for drop stakes associated with load carrying bunks of the conventional flat base type, or with my new and improved inverted V-shaped or side sloping bunk.

A further object of the invention is to provide a locking mechanism for log bunk stakes consisting of levers and links, eliminating the use of chain for holding the stake in a vertical position.

Other objects and advantages will become apparent in the following specification when considered in the light of the attached drawings, in which:

Figure 1 is a fragmentary plan view of the invention showing one of the stakes in a vertical and locked position and another of the stakes in an unlocked and released position.

Figure 2 is an enlarged fragmentary transverse sectional view, taken on the line 2—2 of Figure 1, looking in the direction of the arrows.

Figure 3 is an enlarged fragmentary longitudinal sectional view, taken on the line 3—3 of Figure 1, looking in the direction of the arrow.

Figure 4 is an enlarged fragmentary transverse sectional view similar to Figure 2, of a slightly modified locking device, illustrating the stake in vertical position.

Figure 5 is a plan fragmentary view of a logging bunk and stake assembly mounted on the rear of a tractor vehicle and a logging bunk and stake assembly located on the trailer frame, one of the pairs of stakes being shown released, while the opposite pairs of stakes are shown locked in raised and carrying position.

Figure 6 is a fragmentary end elevation of a vehicle on which the invention is mounted, illustrating a modified log bunk base.

Figure 7 is an enlarged fragmentary vertical cross-section taken on the line 7—7 of Figure 6 looking in the direction of the arrows.

Referring now to the drawings in detail wherein like reference numerals indicate like parts throughout the several figures, the reference character B indicates generally a bunk and stake structure which includes a horizontally disposed beam 10. The beam 10 includes side walls 11 connected together by a web 12. Lower edges 13 of the beam 10 are secured to the upper surface of a truck or trailer frame 14 by any suitable means, as welding 15.

The web 12 does not extend to the opposite ends 16—16' of the side walls 11, and this provides space 17 and space 17' in which are mounted logging bunk stakes 18—18'. The stakes 18—18' are pivotally mounted to the side members 11 respectively by transverse pivot pins 19—19'. The lower ends of the stakes 18—18' have toes 20—20' forming part thereof. The toes 20—20' engage the under surface portions 21—21' respectively of locking bolts 22—22'.

The locking bolts 22—22' are supported upon transverse bases 23—23' which are fixedly secured between the side walls 11 of the bunk B by any suitable means, as for instance welding. Located on opposite ends of the bunk B are bell crank levers 24—24'. The levers 24—24' are pivotally mounted to the side of the bunk B between outwardly extending ears 25—25' by pivot pins 26—26' respectively.

The levers 27—27' of the bell crank levers 24—24' pass through openings 28—28' of the wall 11 of the bunk B and have connecting links 29—29' respectively pivotally secured thereto by pivot pins 30—30'. The opposite ends of the links 29—29' are respectively pivotally connected at 31—31' to the ears 32—32' forming part of the locking bolts 22—22'. The locking bolts 22—22' are held in locked position over the toes 20—20' of the stakes 18—18' when the levers 24—24' are in the position of the lever 24 shown on the right of Figure 1. The ends 33—33' are fixedly connected to ears 34—34' formed on the wall 11 of the bunk B by locking pins 35.

Springs 36—36' are respectively connected between points 37—37' and ears 38—38' forming part of the side wall 11 of the bunk B, to bias the locking bolts 22—22' in locking position at all times.

When the lever 24' is brought to the position shown on the left side of Figure 1, the same will have been released from the ear 34', pivoting about its pivot pin 26', pulling the link 29' therewith by the action of the lever 27' against the spring 36', together with the locking bolt 22' releasing its undersurface 21' from over the top of the toe 20' of the stake 18', allowing the same to lower from a vertical position as shown on the right side of Figure 2, allowing the load to fall from the bunk B.

When the operator releases the lever 24' the spring 36' will return the locking bolt 22' to its locking position. On raising the stake 18' to its vertical position the cam surface 39' will force the locking bolt 22' against the spring 36' until the upper surface of the toe 20' clears the undersurface 21' which will permit the locking bolt 22' to take the same relative position of the bolt 22 shown on the left hand side of Figure 2, again locking the stake 18' in vertical position.

In order to allow the locking bolts 22 and 22' to move easily against a tremendous leverage, rollers 40 and 40' are provided operating on the underside of the web 12 and on the upper surfaces 41 and 41' of the locking bolts 22 and 22', respectively, and further the upper surface of the toes 20 and 20' are sloped to match the inclined surfaces 21 and 21' of the locking bolts 22 and 22' so that with the pressure the same will come to a more or less balanced condition when moving the locking bolts 22 and 22'.

Referring to Figure 5, the levers 24 and 24' have cables 42 and 42' connected thereto at 33 and 33'. The opposite ends of the cables are trained about pulleys 42" and 42'" and are connected to draw bar 43 by releasable hooks 43'. The draw bar 43 is connected to a fast operating cylinder 49, as for instance an air cylinder, by a connecting link 50.

In Figure 5, I illustrate the cables 42' being pulled by the draw bar 43 and the cylinder 49 pulling the levers 24' to the position shown and releasing the drop stakes 18'. The hooks 43' of the cables 42 are illustrated disconnected from the draw bar 43, thereby not effecting the release levers 24 controlling the stakes 18. If these hooks 43' were also connected to the draw bar 43, all four stakes 18—18' would be simultaneously released.

The air cylinder 49 is operated by an air supply valve, not here shown, but at a remote distance from the cylinder 49 so that the operator is safe when releasing the stakes 18—18' and dumping the load.

Normally the cables 42 and 42' would be in a slacked off position while the vehicle is being moved from place to place permitting the turning of the tractor in regards to the trailer. It will be noted that clamping means 51 is provided on the cables 42 and 42' to lengthen or shorten them, depending upon the distance the trailer is extended out from the tractor vehicle.

I will now describe the mode of operation of this new and improved locking mechanism for holding stakes 18—18' in regard to bunks B in a vertical and carrying position.

On viewing Figures 1, 2 and 5, the stakes 18 on the left hand side of these views are in vertical and carrying position, being held there by the tips of the locking bolts 22 as above described, while the stakes 18' on the right hand side of these views are in released position, illustrating the locking bolts 22' in retracted or released position, assuming they are being held in this position by the operator, or by the cables 42' as shown in Figure 5.

When the operator releases the cable 42', the springs 36' will return the bolts 22' to their extended or locking position. When the stake 18' is raised the cam surface 39' will force the tips of the locking bolts 22' against the tension of the spring 36' until these tips clear the upper surface of the toes 20' when the bolt 22' will be forced outwardly over the surface of the position on the left of Figures 1, 2 and 4.

The levers 24 and 24' may be operated individually or in unison by the action of the cables 42 and 42' as above described, or the cables 42 and 42' may be entirely eliminated, but it has been found that there is some advantage in being able to trip the stakes 18—18' on either one side of the load at a time or on both sides of the load at a time by the operator at a remote and safe distance from the load being dumped. The cables 42—42' facilitate this action.

By the use of springs 36 and 36' for resetting the locking bolts 22—22', all the operator has to do is to raise the stakes 18—18' to vertical position and the same will be locked in this position by the locking bolts 22—22', after which he can insert the locking pins 35 into the ears 34—34' and the ends of the levers 24 and 24' holding the locking bolts 22—22' in locking position for holding the drop stakes in a vertical and load carrying position.

Referring to Figures 6 and 7, an inverted V-shaped load supporting base 52 is mounted upon the bunk B and secured thereto by any means, as by the tongues 53 embracing the bunk. This inverted V-shaped base 52 can even be part or integral with the bunk B. The object of this base 52 is to provide a sloping supporting surface 54 upon which the logs ride so that when the drop stakes 18—18' are released, gravity will cause the logs to move down the sloping surface and drop off the ends of the bunk B of their own weight. Heretofore on releasing the load of logs, one or more logs would rest on the bunk B and would have to be manually or otherwise removed therefrom.

Having thus described the preferred embodiments of the invention, it should be understood that numerous other structural modifications and adaptations may be resorted to without departing from the scope of the appended claims.

What is claimed is:

1. A logging bunk comprising an elongated horizontal beam including a pair of spaced parallel walls integrally connected by a horizontal web, said web terminating short of the ends of said beam, a stake positioned between said walls at each end of said beam outwardly of the ends of said web, horizontal pivot means securing each of said stakes to said side walls mounting said stakes for swinging movement from an upstanding position outwardly and downwardly to a depending position with respect to said beam, a toe formed integrally on each of said stakes extending inwardly of said beam with said stakes in upright position, said toe having a downwardly and inwardly sloping upper surface, a base member extending between said side walls at each end of said web in spaced parallel underlying relation to the end portions of said web, a horizontally slidable bolt positioned between said base member and said web at each end thereof, an upwardly and outwardly sloping lower face formed on the outer end portion of said bolt for overlying engagement with the upper surface of said toe with said bolt at the outer end of its sliding movement releasably securing said stake in upright position, a bell crank lever pivotally secured to each end of said beam, a link connecting one end of each of said bell crank levers to the inner end of the respective bolt for sliding said bolt on pivotal movement of said bell crank lever, and spring means extending between said bell crank lever and said beam normally biasing said bell crank lever in a direction to slide said bolt outwardly to stake securing position.

2. A device as claimed in claim 1 wherein said toe is provided with an arcuate cam faced lower surface arranged to cam said bolt inwardly on swinging said stake to its upright position.

3. A device as claimed in claim 1 wherein antifriction roller means is positioned between said web and said bolt to facilitate the moving of said bolt when supporting said stake.

References Cited in the file of this patent

UNITED STATES PATENTS

| | | |
|---|---|---|
| 1,838,736 | Bonham | Dec. 29, 1931 |
| 2,256,623 | Newman | Sept. 23, 1941 |
| 2,661,235 | Isachsen | Dec. 1, 1953 |
| 2,733,077 | Davidson | Jan. 31, 1956 |
| 2,788,225 | Caton | Apr. 9, 1957 |

FOREIGN PATENTS

| | | |
|---|---|---|
| 130,717 | Austria | Dec. 10, 1932 |